United States Patent [19]

Bald

[11] Patent Number: 4,573,380

[45] Date of Patent: Mar. 4, 1986

[54] APPARATUS FOR PRODUCING AN ADJUSTING ROTARY MOVEMENT

[76] Inventor: Hubert Bald, Schutzenstrasse 1, D-5920 Bad Berleburg, Fed. Rep. of Germany

[21] Appl. No.: 493,745

[22] Filed: May 11, 1983

[30] Foreign Application Priority Data

May 13, 1982 [DE] Fed. Rep. of Germany ....... 3218084

[51] Int. Cl.⁴ .............................................. B23B 19/00
[52] U.S. Cl. ...................................... 82/28 R; 82/1.2; 82/2 E; 82/30; 279/1 R
[58] Field of Search ................... 279/1 M, 4, 1 R, 1 C, 279/111; 82/2 B, 2 E, 1.2-1.5, 28 R, 29, 30, 59, 67, 68, 40 R; 408/10, 133; 409/233; 310/80, 83, 191

[56] References Cited

U.S. PATENT DOCUMENTS

| 2,301,171 | 11/1942 | Morton et al. | 408/133 |
| 2,883,889 | 4/1959 | Diener | 408/133 |
| 3,771,802 | 11/1973 | Hiramatu et al. | 279/4 |
| 3,815,929 | 6/1974 | Steinberger et al. | 279/4 |
| 3,898,911 | 8/1975 | De Caussin | 409/233 |
| 3,922,936 | 12/1975 | Link | 82/28 R |
| 4,080,716 | 3/1978 | von Dorp | 279/4 |
| 4,232,547 | 11/1980 | Kasper | 73/141 A |
| 4,254,676 | 3/1981 | Wilson | 279/1 R |
| 4,386,544 | 6/1983 | Fuminier | 82/40 R |
| 4,411,178 | 10/1983 | Wachs et al. | 82/2 E |
| 4,414,871 | 11/1983 | Trout | 82/40 R |

FOREIGN PATENT DOCUMENTS

| 2601493 | of 1975 | Fed. Rep. of Germany | 308/204 |
| 2725747 | of 1978 | Fed. Rep. of Germany | 82/67 |
| 2659066 | 7/1978 | Fed. Rep. of Germany | 408/10 |
| 2734126 | 2/1979 | Fed. Rep. of Germany | 82/1.2 |
| 2846337 | 5/1979 | Fed. Rep. of Germany | 82/2 B |
| 486871 | of 1976 | U.S.S.R. | 409/233 |

Primary Examiner—Leonidas Vlachos
Attorney, Agent, or Firm—McCormick, Paulding & Huber

[57] ABSTRACT

The apparatus permits the relative rotation of a component on a rotating spindle by means of a superimposition drive having two inputs and one output. At one input the spindle rotation is fed in, while at the other a desired rotation of the component, which in turn is connected to the output of the drive, is fed in. The rotational position and/or rotating force can be measured and controlled. Applied to adjusting movements on machine tool spindles, for example for powered chucks or radially adjustable rotating tools.

22 Claims, 8 Drawing Figures

APPARATUS FOR PRODUCING AN ADJUSTING ROTARY MOVEMENT

The invention relates to an apparatus for producing an adjusting rotary movement in a movement conversion system which rotates together with a work spindle and to whose input member the adjusting rotary movement is to be transmitted, while the supporting member of the system supports the reaction adjusting torque. The movement conversion system may for example be a screw mechanism arrangement in which the adjusting rotary movement is converted into an axial displacement by means of which, for example, a chuck is operated; the reaction adjusting torque is opposite and equal to the adjusting torque minus the torques required for covering friction losses.

This electric clamping device can be incorporated in the work spindle of a lathe, and then rotates with the said spindle. Since, as viewed from the the electric clamping device, the work spindle is consequently "stationary", the operation is independent of any rotation of the spindle, irrespective of the fact that this electric clamping device is designed only to be put into operation in the stationary state.

Even if this known device were to be designed also to be put into operation during the rotation of the spindle, it would be subject to considerable restrictions. At high rotational speeds, such as are indispensable for work spindles if the properties of modern tool materials are to be utilized, the considerable moment of inertia of the motor must be simultaneously accelerated and retarded during the starting-up and slowing-down of the spindle respectively, and the mechanical strength of components of the motor may then no longer withstand the centrifugal forces occurring at very high speeds.

The problem underlying the invention is that of providing an apparatus which permits, even at very high spindle speeds, the transmission of an adjusting movement imposed from outside to the corotating input member of a movement conversion system.

Accordingly, a superimposition drive is coupled to the supporting member and to the input member of the movement conversion system in such a manner that a rotation taken from the supporting member is transmitted synchronously to the input member as long as no adjusting movement is required. Only when an adjusting movement has to be made is an adjusting rotary movement superposed on this synchronous rotary movement, that is to say added to it or subtracted from it, while the actual adjusting drive has to supply only the generally relatively low rotational speed. In practice only mechanical or magnetic superimposition is possible for the introduction of the adjusting torque. The corresponding transducer need not corotate with the spindle.

Examples of embodiment of the subject of the invention are explained more fully below with reference to the accompanying drawings, in which.

Figure 1:
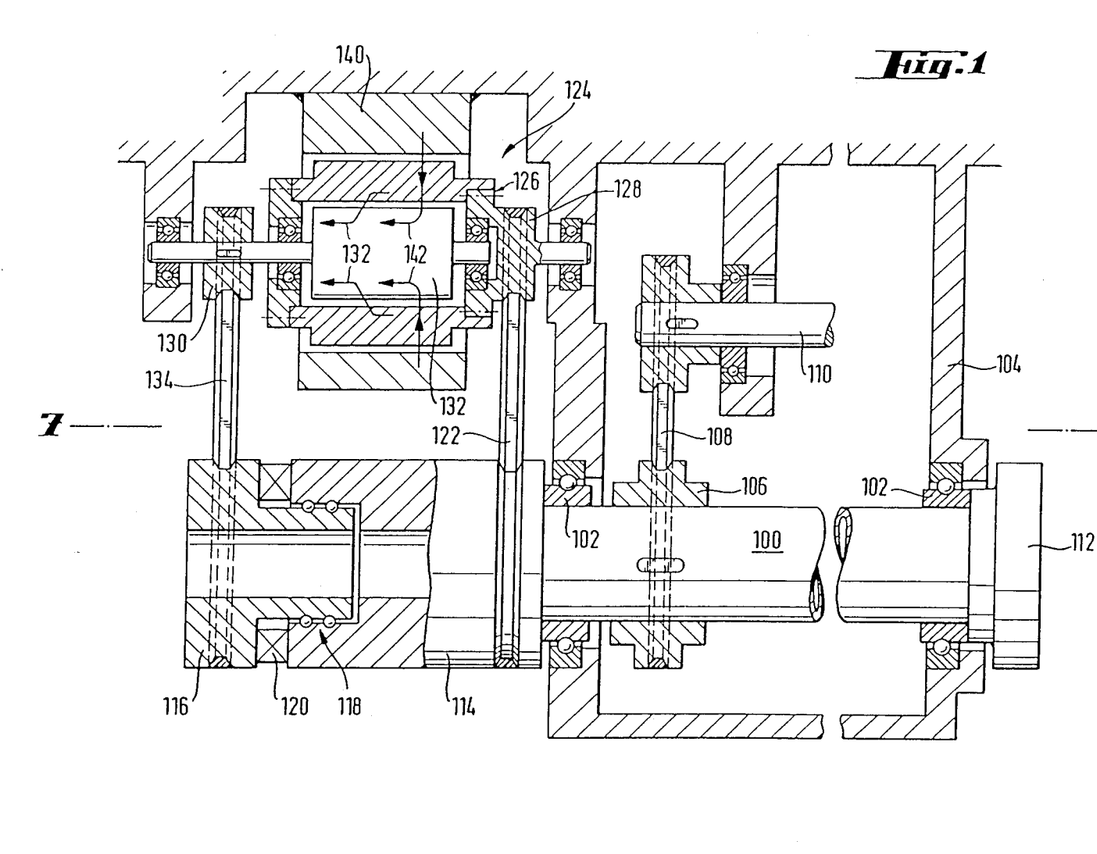
FIG. 1 shows the basic principle of the apparatus according to the invention in schematic partial section.

FIG. 1 shows schematically the spindle 100 mounted by means of rolling contact bearings 102 in a casing 104. The spindle 100 is driven rotationally by means of a belt pulley 106, a Vee-belt 108, and a motor output shaft 110.

On the right of the casing in the drawing the spindle carries a work head 112, for example a chuck for a workpiece or a tool. At the other end of the spindle a movement conversion system is flanged onto the spindle 100, the construction of this system not being shown in detail here. However, it is possible to see a supporting member 114 rigidly joined to the spindle, an input member 116 which is rotatable relative to the member 114 and is mounted in ball bearings at 118 in the supporting member, and transmission members 120 which transmit the relative rotation of the two members 114 and 116 to components (not shown) accommodated in the spindle 100.

The supporting member 114 is coupled by means of a belt 122 to the synchronising input of a superimposition drive 124, which here is provided with a belt pulley 128 mounted on an external rotor 126. Similarly, the addition output of the superimposition drive 124, in the form of a belt pulley 130 which is mounted on an inner rotor 132, is connected by a belt 134 to the input member 116. The two rotors are mounted one in the other and in the casing 104 for low-friction rotation.

A stator 140 is situated, as part of a transducer, outside the two coaxial rotors. This transducer should work as follows:

If no energy is supplied to it from outside, the supporting member 114 and the input member 116 should rotate at exactly the same speed. For the sake of simplicity it will be assumed that the belts 122 and 134 are cogged belts and that the engagement diameters of the pulleys coupled by them are likewise exactly equal. Provided that the stator 140 is still not put into operation, the two rotors 126 and 132 should then also rotate at exactly the same speed. This is symbolized by the arrows 138. If the stator 140, which constitutes the energy transducer for the superimposition input of the drive 124, is then energized with adjusting energy, a corresponding additional torque should be transmitted, irrespective of the spindle speed at the time in question, solely to the inner rotor 132, and this then leads to the desired relative rotation of the input member 116 relative to the supporting member 114. This is symbolized by the arrows 142.

It should at this point be observed that constrained synchronization by means of cogged belts or other mechanical means is not indispensable. If transmission members permitting slip are used, such as Vee-belts, however, feedback of the actual angular position of the input member 116 relative to the supporting member at the time in question will be necessary, in order to ensure that corresponding signals compensating for any slip that occurs can be fed to the stator.

Concrete forms of construction of the superimposition drive will now be explained below, in the first instance with reference to FIG. 2.

The superimposition drive 224 described here works electromagnetically.

The inner rotor 232 carries three magnetically conductive rings 244a, 244b and 244c, on whose axial ends respective pole teeth 246a, 246b and 246c are provided externally. The pole teeth at one end of each of the three rings are axially in alignment with the pole teeth at the other end of the same ring.

The outer rotor 226 comprises magnetically conductive intermediate ring pairs 250a, 250b and 250c respectively, which are spaced apart from one another by means of magnetically nonconductive supporting and spacer rings 248, the intermediate rings of each pair "a", "b" and "c" respectively being likewise separated from one another by spacer rings 252a, 252b and 252c respectively.

The intermediate rings 250 likewise carry pole teeth, which lie opposite the pole teeth of the respective rings 244.

The stator consists of three yoke rings 254a, 254b and 254c, each with its inserted winding 256a, 256b, 256c, which can be separately loaded with voltage by a control device (not shown) through the supply lines 258a–c.

It will in the first instance be assumed that only the winding 256a will have direct current applied to it. This produces a magnetic field, which in FIG. 2 is indicated by the arrow 260 and which tends to align the pole teeth of the intermediate rings 250a with the pole teeth 246a of the ring 244a in such a manner that the air gap between teeth lying opposite one another is minimal. This action is achieved irrespective of the angular position assumed by the system comprising the internal and external rotors relative to the stator 240, since the rings 244 and the intermediate rings 250 are all complete in themselves.

The magnetic coupling between the internal and external rotors is therefore maintained even during the rotation of the spindle, this rotation being transmitted by means of the belt 222 to the external rotor 226 and by means of the belt 234 being taken from the internal rotor and transmitted to the input member of the movement conversion system. The air gap 257 then forms the superimposition input of the drive.

It will be assumed that the pole teeth 246b and 246c coincide, in respect of their angular position relative to the internal rotor 232, with that of the pole teeth 246a, that is to say that all the pole teeth of the internal rotor are axially in alignment. This, however, is not true of the angular position of the intermediate rings 250b and 250c, whose pole teeth are respectively offset, relative to the angular position of the intermediate ring 250a, by one third of a tooth spacing the one peripheral direction or the other. When the voltage is therefore switched over from the winding 256a to the winding 256b, the internal rotor is therefore turned one third of a pole tooth spacing, when it is further switched over to the winding 256c the rotor is turned another third, while when the voltage is switched back to the winding 256a a relative rotation of the internal and external rotors by one complete tooth spacing is finally achieved. The apparatus therefore works very similarly to a stepping motor. It is obvious that the angular offsetting of the pole teeth could also be effected on the internal rotor instead of on the external rotor; instead of a travelling field with an axial direction of travel, it would also be possible to use a travelling field with a radial direction of travel, in which case oppositely disposed flat discs carrying the pole teeth would be provided.

Figure 2:
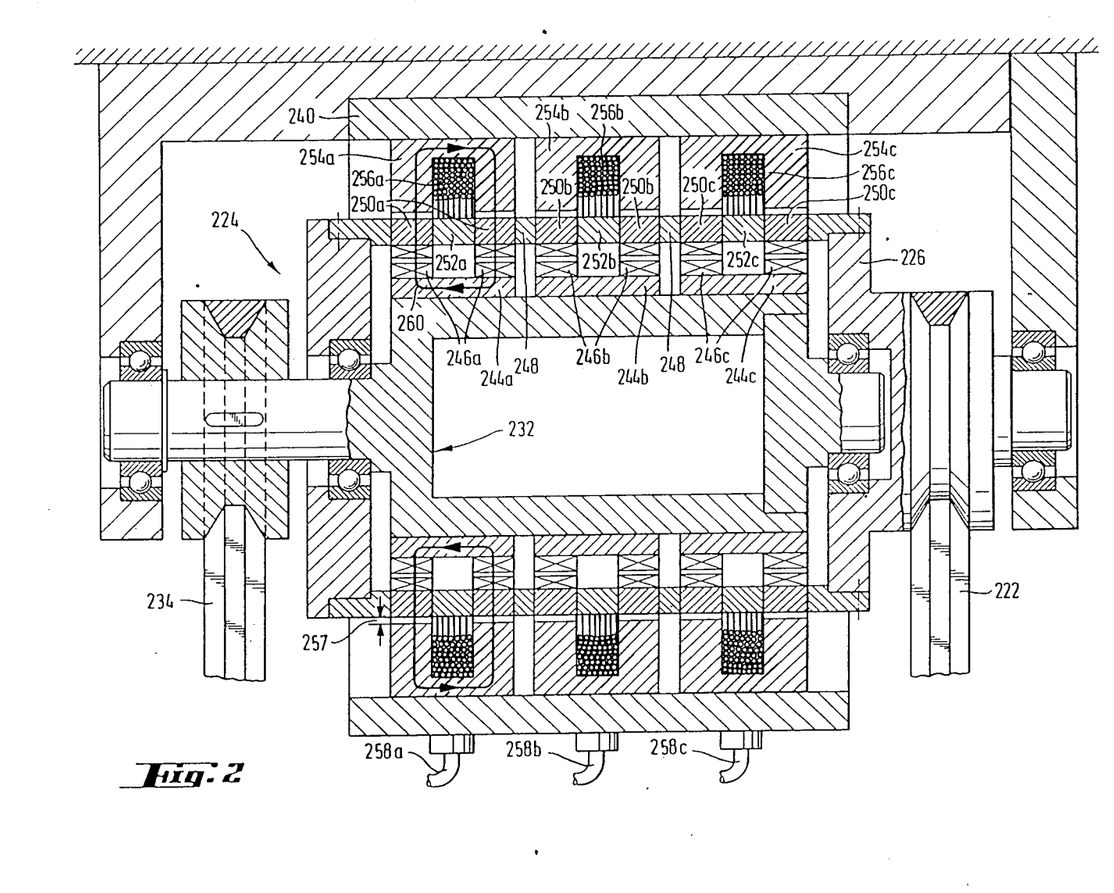
FIG. 2 is an axial section of a first embodiment for a superimposition drive according to the invention.
Figure 3:
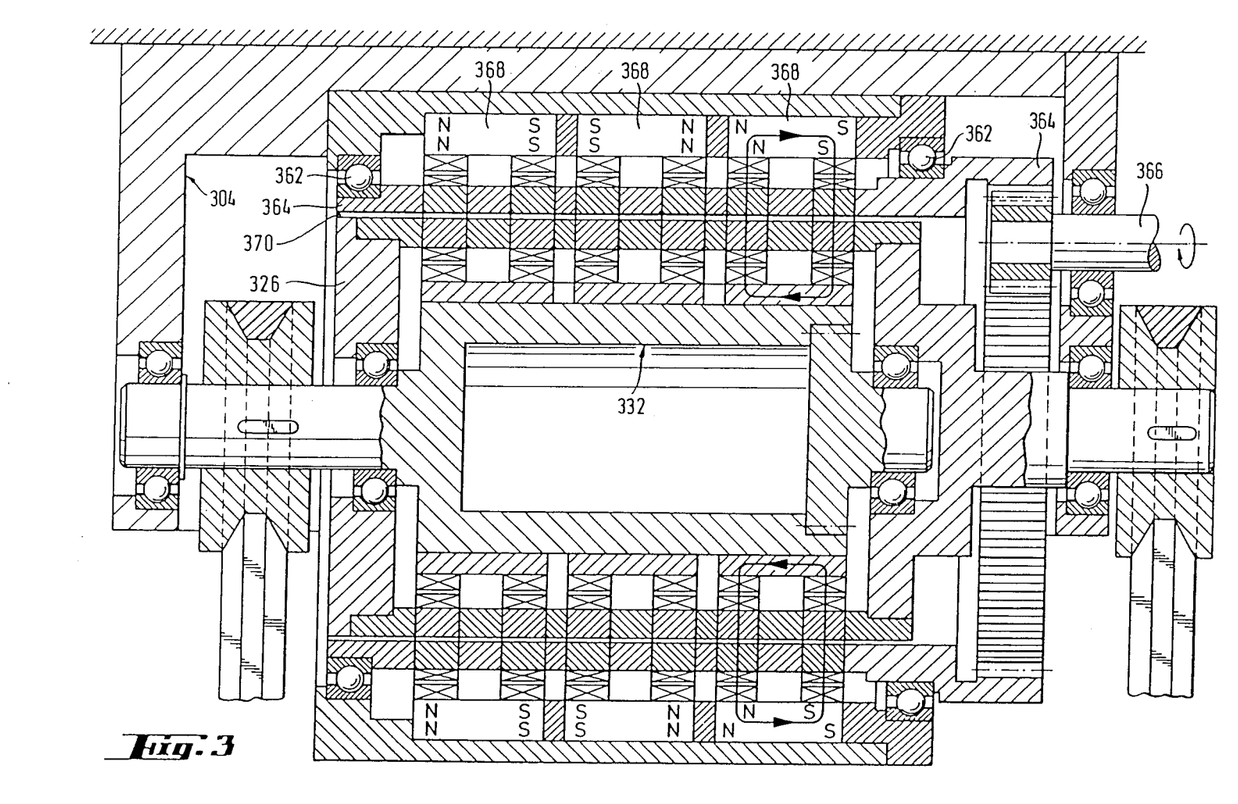
FIG. 3 shows a modified embodiment similarly to FIG. 2.

In the embodiment shown in FIG. 3 the construction of the internal rotor 332 and that of the external rotor 326 correspond exactly to that described in in connection with FIG. 2, so that here a repetition of the explanation is unnecessary. However, the magnetic fields are not caused to perform axial cyclic "travel" by electric switching, but are produced by permanent magnets and are switched over by mechanical movement.

For this purpose, in addition to the external rotor 326 another hollow cylinder 364, which will here be referred to as an "adjusting rotor" and which is mounted in ball bearings at 362, is provided and is rotatable relative to the casing 304 by means of an adjusting motor shaft 366. The adjusting rotor is of a construction similar to that of the internal rotor, with the exception that the pole teeth are turned outwards. The pole teeth of permanent magnet rings 368 are disposed opposite the pole teeth of the adjusting rotor 364, all the pole teeth of the said rings having the same angular position, similarly to the pole teeth of the internal rotor 332, while the pole teeth of the adjusting rotor, as described above for the pole teeth of the external rotor, are each offset one third of a pole tooth spacing in the peripheral direction. The magnetization direction of the magnet rings 368 is indicated by N, S. At any given moment the magnet system in operation is that in which the angular position of the adjusting rotor produces the minimum air gap between the pole teeth of the adjusting rotor and the magnet rings. Through the turning of the adjusting rotor relative to the casing 304, the magnetic fields are switched over from system to system, as can easily be seen. It is moreover obvious that the adjusting rotor does not participate in the rotation of the spindle; the magnetic fields are however operative in any angular position of the system comprising the internal and external rotors, since the rotation of this system makes no change in the air gap 370 between the external rotor and the adjusting rotor. It can easily be seen that instead of the adjusting rotor it would be possible to provide a stationary tube of the same construction, if instead the permanent magnet rings 368 were arranged for conjoint rotation.

Figure 4:
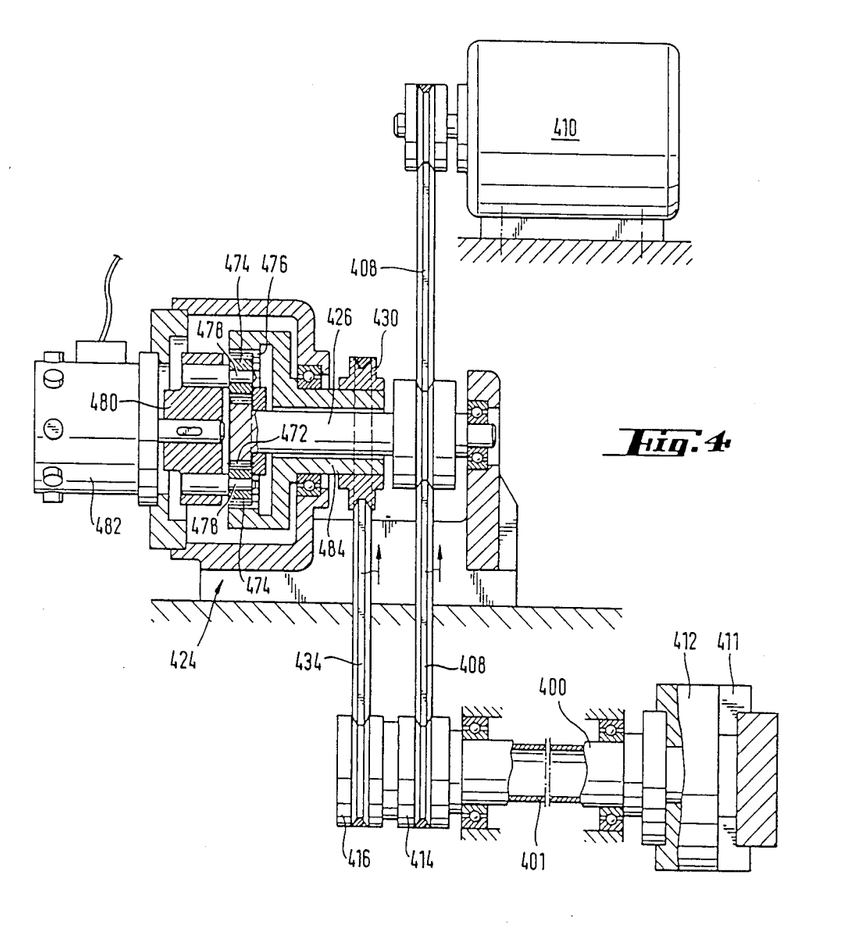
FIG. 4 shows an embodiment having a mechanical superimposition drive, applied to a lathe spindle.

In the embodiment shown in FIG. 4 the spindle 400 is driven directly on the supporting member 414, which is rigidly connected to it, by a spindle drive motor 410 with the aid of a belt 408. The input member 416 receives its drive through a belt 434 from a belt pulley 430. In the spindle construction it is indicated that a rotation of the input member relative to the spindle leads to an axial displacement of a push-pull tube 401, which in turn results in a radial displacement of the clamp jaws 411 of a chuck 412; the fundamental construction of powered chucks of this kind is well known and therefore need not be explained.

The superimposition drive 424 comprises a sun gear shaft 426, which is driven by the belt 408 in the correct direction of rotation, as indicated in the drawing. It carries a sun gear 472, which by means of planet gears 474 is in engagement with an internal rim gear 476. The planet gears 474 are mounted on journals 478 of a planet carrier 480, which in turn is mounted on the output shaft of an adjusting motor 482. The internal rim gear carries on an axial extension 484, which is mounted in a rolling contact bearing on the sun gear shaft 426, the belt pulley 430. The construction of such planetary gear trains is known per se. It will in the first instance be assumed that the transmission ratios are so selected that when the planet carrier 480 is stationary the shaft 426 rotates in synchronism with the internal rim gear 476 in such a manner that no relative rotation occurs between the input member 416 and the supporting member 414. The adjusting motor 482 can then bring about a relative rotation of the two members when it is turned in one direction or the other; the journals 478 are then to be regarded as the superimposition input of the gear unit.

It is however preferable to select the transmission ratio in such a manner that at a medium speed of rotation of the adjusting motor no relative rotation of the members 414 and 416 takes place, since the control of the adjusting motor can be more easily mastered from this medium speed. In this embodiment therefore a mechanical torque is introduced directly into the superimposition drive.

Figure 5:
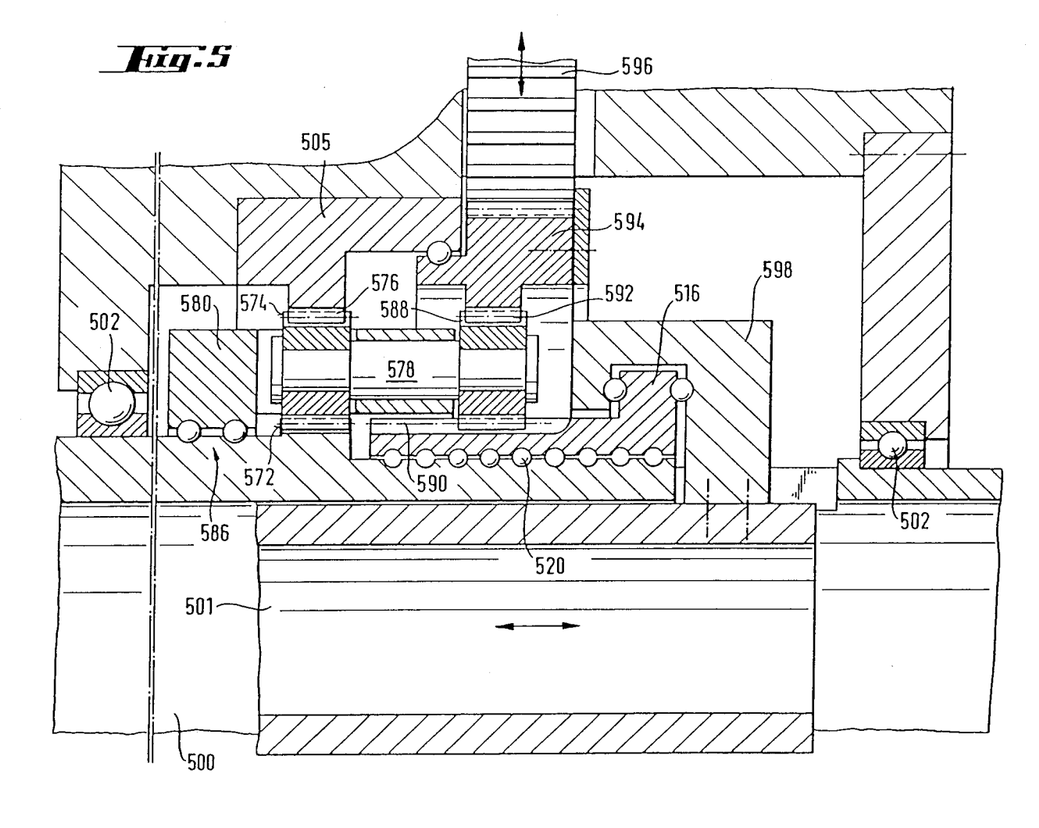
FIG. 5 shows the embodiment shown in FIG. 4, modified in such a manner that a coaxial construction is obtained.

FIG. 5 illustrates a modification of the embodiment shown in FIG. 4, the planetary gear train here being disposed coaxially to the work spindle 500. On the spindle, which itself is mounted at 502, is mounted in a rolling contact bearing at 586 a planet carrier ring 580, on whose journals 578 planet gears 574 are mounted for rotation. They roll on the one hand on the sun rim gear 572 of the spindle 500, and on the other hand on the internal rim gear 576, which is formed on a ring 505 mounted fast in the casing 504. A second planet pinion 588 is mounted in each case on the journals 578 and is driven by the journal during the rotation of the planet carrier. It rolls on the one hand on an external toothing 590 of the input member 516, and on the other hand on an internal toothing 592 of an adjusting ring 594 which is mounted for rotation relative to the casing and is adapted to be driven by an adjusting motor (not shown) with the aid of a cogged belt 596 or in some other way.

When the ring 594 makes a rotary movement, the input member 516 turns relative to the spindle, which at the same time constitutes the supporting member. The input member is mounted on the spindle 500 by means of balls 520 which form the transmission members of a rolling screw mechanism whose external thread is formed on the spindle, while its internal thread is formed in the input member in the form of running grooves of spherical profile and of predetermined pitch, so that when a relative rotation of the input member 516 occurs the member 516 at the same time makes a relative axial movement along the spindle 500. The toothings 588 and 590 do not come out of engagement during this movement, since the toothing 590 has a correspondingly long axial length. These axial displacements of the input member are transmitted through a thrust flange 598 to the push-pull tube 501.

Figure 6:
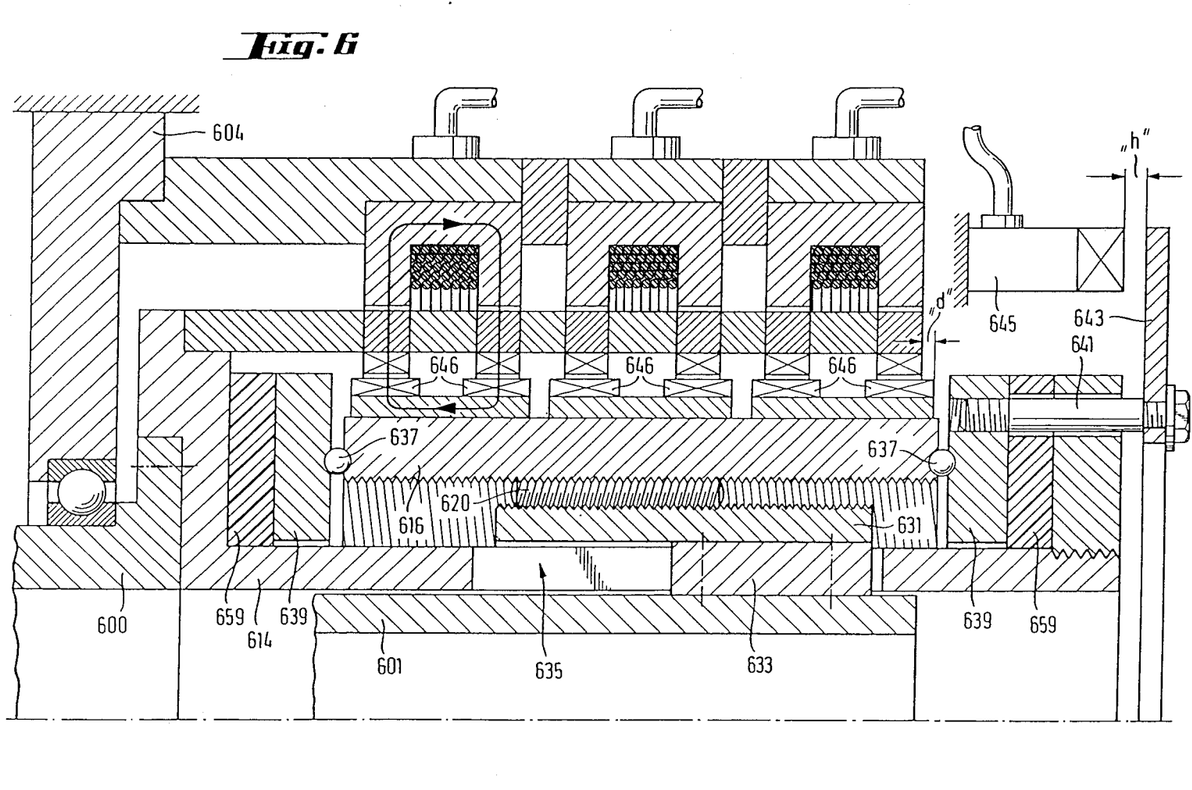
FIG. 6 shows another modification of the embodiment shown in FIG. 2.

FIG. 6 illustrates an application of the apparatus explained above with reference to FIG. 2. Here the apparatus is disposed at the rear end of a lathe spindle 600, that is to say at the end of the headstock 504 remote from the chuck, and serves to operate the jaws of the clutch with the aid of a push-pull tube 601.

The supporting member 614 of the movement conversion system is flanged on the spindle 600 in the form of an extension of the spindle. The input member 616 is in the form of an elongated tubular rolling screw nut, which is supported by means of rolling screw rollers 620 on the appertaining external screwthread of a ring 631, thereby being guided rectilinearly and being adapted to roll thereon. The ring 631 is rigidly connected to the tube 601 with the aid of driver sectors 633, which engage through guide slots 635 in the member 614 and ensure that the tube 601, although able to make an axial movement relative to the said member, cannot rotate relative to the spindle. If the input member is now turned relative to the supporting member in the manner explained with reference to FIG. 2, an axial displacement of the push-pull tube 601 is effected in accordance with the pitch of the rolling screwthread.

As soon as the clamp jaws or the tube 601 itself encounter resistance braking any further axial displacement, that is to say if for example the clamp jaws run against a workpiece which is to be clamped, the storage of force should be effected through the further turning of the input member. For this purpose the input member 616 is supported at both ends by means of end ball bearings 637 on thrust rings 639 which rotate with the supporting member and behind which annular elastomer springs 659 are disposed. As soon as the tube 601 encounters resistance, the input member 616 starts an axial displacement in the opposite direction, compressing the corresponding elastomer spring. The magnetic introduction of the torque is is nevertheless possible, because the pole teeth 646 are widened accordingly, on both sides, by the amount of the maximum permissible compression stroke "d". Pins 641 carrying a corotating measuring ring 643 are are joined to the thrust ring 639 remote from the headstock 604. The axial position "h" of the ring 643 in relation to a distance sensor 645 provides a measure of the stored force, given a known spring characteristic of the elastomer springs 659.

Figure 7:
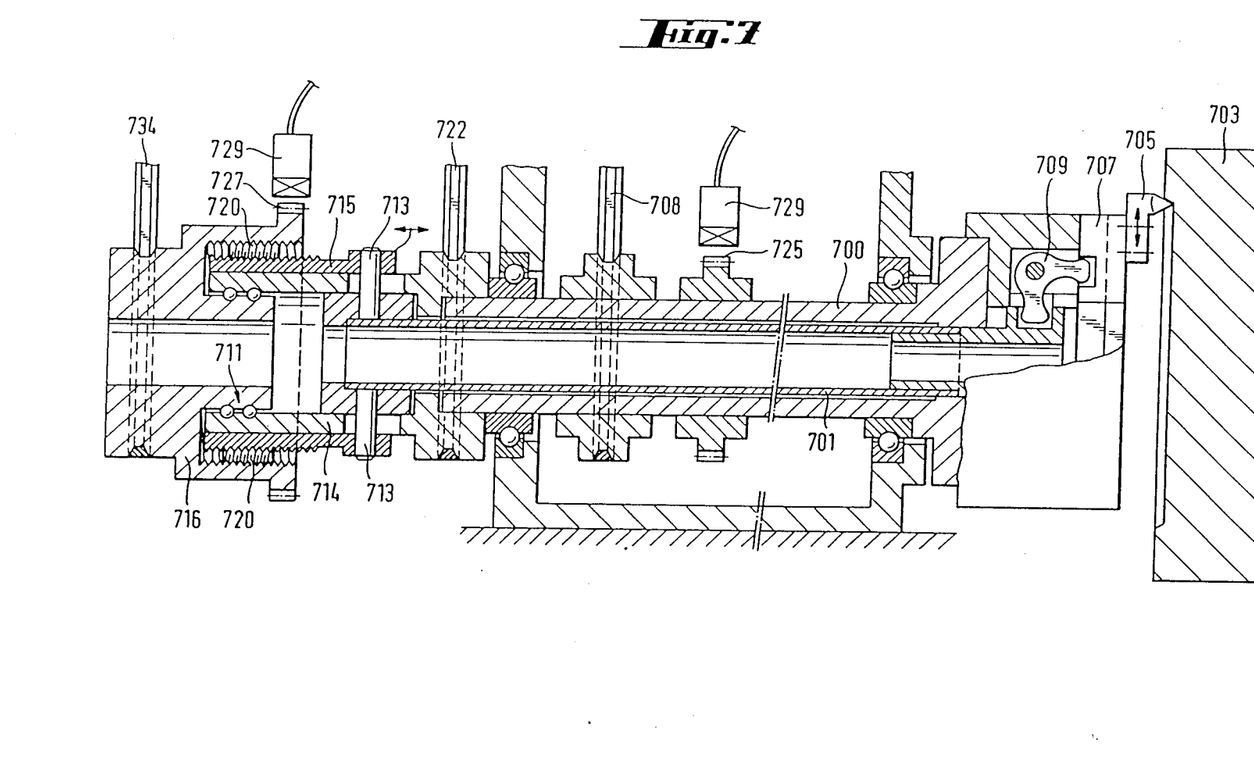
FIG. 7 shows an application of the apparatus, and could for example comprise the components beneath the line 7—7 in FIG. 1.

FIG. 7 shows how, as an example, the apparatus shown schematically in FIG. 1 can be used in the part shown beneath the line 7—7.

The input member 716, which is mounted at 711 in the supporting member 714 so as to be capable of relative rotation but not of axial movement, brings about, when caused to make a relative rotation by means of the rolling roller screw mechanism 720, an axial displacement of the sleeve 715, which is connected to the supporting member 714 in such a manner as to be axially displaceable by means of drivers 713 but incapable of rotation, and the sleeve 715 also correspondingly displaces the push-pull tube 701, by means of the drivers 713, relative to the spindle 700, to which the supporting member is rigidly connected. The belts 708, 722 and 734 correspond in their functions to the belts 108, 122 and 134 in FIG. 1 respectively. The tube 701 acts via angle levers 709 on a radially displaceable toolholder 707, which for example holds an internal turning tool 705 for a workpiece 703. Deflector lever constructions of this type are known per se. With the aid of the apparatus according to the invention, an adjustment can now be made during the rotation.

The spindle 700 carries a measuring rim gear 725, and the input member 716 also carries a measuring rim gear 727, inductive transducers 729, for example, being associated with each of the said rim gears. The absolute number of teeth moving past, which can easily be detected and compared by electronic means, provides a measure of the angular positions of both members 700 and 716 and thus also makes it possible to determine the relative angular position at any given moment. The number of teeth moving past per unit of time can also be determined, so that data regarding the relative speeds of rotation can thus be obtained. The actual data thus obtained can be used with the aid of a control device for control signals for the adjusting drive. The rolling screw mechanism used as movement conversion system in FIGS. 5 to 7 is particularly suitable for this purpose, because, being a low-friction system, it makes it possible to work with low installed adjusting powers if suitably small rolling screwthread pitches are selected. It is, however, obvious that the invention is not restricted to a movement conversion system of this kind; any other mechanical or even hydraulic systems may be used. For control or automatic control purposes, the numerical control system generally already existing in modern machine tools (to which however the object of the invention is in no way restricted in respect of its possible applications) can be suitably adapted. In the case of the embodiment illustrated in FIG. 3 or FIG. 4, it is even possible to use the same types of adjusting motors as are used for the feeds; in the case of FIG. 2 a special converter will be required.

Figure 8:
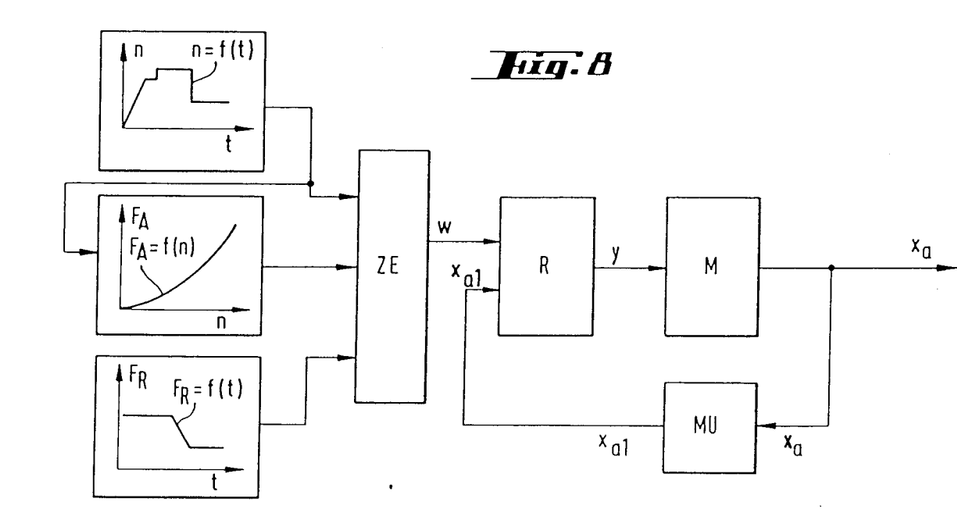
FIG. 8 is a block circuit diagram explaining the manner in which the operating signals for the adjusting transducer can be obtained.

FIG. 8 shows in the form of a block diagram a control system for clamping force, for example with the apparatus shown in FIG. 6. For the machining of a determined workpiece it will be assumed that a speed program $n=f(t)$ has been predetermined and that the clamping force of the chuck is to follow a program $F_R=f(t)$, because during a rough machining program, for example, high clamping forces are required, which are reduced during smoothing in order to lessen the elastic deformation of the workpiece. In addition, speed-dependent centrifugal forces also act on the clamp jaws and must likewise be compensated by corresponding variation of the clamping force. The centrifugal forces occurring in a determined position of the jaws can be measured before commencement of the work—the output signals of the distance sensor 645 can be used for this purpose—and these forces can be stored in tabular form or as a function $F=f(n)$, so that during working they can be recalled in dependence on the appertaining speed "addresses". These data n, $F_R$ and $F_A$ are fed as command variables to a central unit ZE, which from them forms a command variable w for the control device R. The manipulated variable y produced by the latter controls the adjusting motor M or, in the case of FIG. 6, the generator for the frequency of the pole change to be applied to the adjusting windings. The clamping force $x_a$ is controlled, being converted by means of the measuring transducer—elastomer springs 659 plus distance sensor 645 in FIG. 6—MU into the measured variable $x_{a1}$.

It is obvious that the force storage means could also be arranged to be non-rotary, and that the measurement of the clamping force could also be effected in a different manner, for example on the basis of the power input of the adjusting motor. Moreover, a movement conversion system in which the rotary movement is converted into an axial displacement has been provided solely in the embodiments described, and it is clear that other forms of conversion are possible, such as only a torque conversion.

I claim:

1. The combination comprising a machine having a continuously rotating spindle for carrying a tool or workpiece, and an apparatus for producing an adjusting rotary movement relative to said continuously rotating spindle, said apparatus having roller worm gear movement conversion means for converting rotary movement to axial displacement and including a supporting member carried by said spindle and coaxially rotatable therewith, a threaded input member supported by said supporting member for coaxial rotation with and relative to the supporting member, a threaded output member supported on said spindle for rotation with said spindle and axial movement along said spindle, and a plurality of threaded rollers disposed between and threadably engaged with said input member and said output member for axially displacing said output member along said spindle in response to rotation of said input member relative to said threaded output member to transmit force to a tool or workpiece carried by said spindle, a spindle drive motor, means for coupling said drive motor to said spindle to rotate said spindle, and means for adjusting the rotary movement of said movement conversion means including a superimposition drive mechanism having a synchronizing input coupled to said supporting member, a superimposition input coupled to said threaded input member, an additional output operatively connected to said superimposition input and coupled to said threaded input member, and an adjusting energy converter stationary relative to at least one of the members and operatively connected to the superimposition input.

2. The combination as claimed in claim 1, wherein the adjusting energy converter is an electromagnetic transducer for producing magnetic alternating fields, and wherein the operative connection to the superimposition input is effected through magnetic coupling.

3. The combination as claimed in claim 1, wherein the adjusting energy converter converts mechanical energy into the energy of magnetic alternating fields which are magnetically coupled to the superimposition input.

4. The combination as claimed in claim 1, wherein the adjusting energy converter is an electromechanical transducer producing output torque which is fed to the superimposition input.

5. The combination as claimed in claim 1, wherein the adjusting energy converter is a fluid pressure-mechanical transducer producing output torque which is fed to the superimposition input.

6. The combination as claimed in claim 2 wherein the adjusting energy converter produces a magnetic axial travelling field with a plurality of phases in accordance with a magnetic rotating field.

7. The combination as claimed in claim 6, wherein the adjusting energy converter has windings and each phase is associated with a winding and the windings are adapted to be alternately put into operation with a frequency which determines the rotational adjusting speed.

8. The combination as claimed in claim 3 wherein an axial offsetting of the magnetic fields is effected with the aid of a mechanical-magnetic field commutator.

9. The combination as claimed in claim 1, wherein the movement conversion system converts rotary movement into a radial movement of a component relative to the axis of the spindle.

10. The combination as claimed in claim 1, wherein a force storage means is provided for receiving force produced by the movement conversion system.

11. The combination as claimed in claim 10, wherein the force storage means corotates with the spindle.

12. The combination as claimed in claim 10, wherein the force storage means comprises a spring.

13. The combination as claimed in claim 1, wherein a measuring member is provided for measuring the force produced by the movement conversion system.

14. The combination as claimed in claim 13, wherein at least one element of the measuring member is arranged to corotate with the spindle.

15. The combination as claimed in claim 10, wherein the force storage means comprises an elastically deformable element having a known force-deformation function, and wherein the measuring member detects the deformation of said elastically deformable element.

16. The combination as claimed in claim 1, wherein the superimposition drive is constructed and arranged coaxially relative to the work spindle.

17. An apparatus as claimed in claim 3, wherein the adjusting energy converter comprises a servomotor operated by a numerical control system.

18. The combination as claimed in claim 1, which is provided with a measuring device for detecting the relative angular positions of the input member and the supporting member.

19. The combination as claimed in claim 13, which is provided with a control device for adjusting the force produced.

20. The combination as claimed in claim 19 further characterized by means within said control device for compensation of speed-dependent clamping force due to deviations caused by centrifugal force of the spindle and the work held thereon.

21. The combination as claimed in claim 18, which is provided with a control device for the relative angular position.

22. The combination as claimed in claim 21 further characterized by a rotating tool, said rotating tool having radially adjustable cutting edges, and means for the adjustment of said cutting edges in dependence on a predetermined work program.

* * * * *